UNITED STATES PATENT OFFICE.

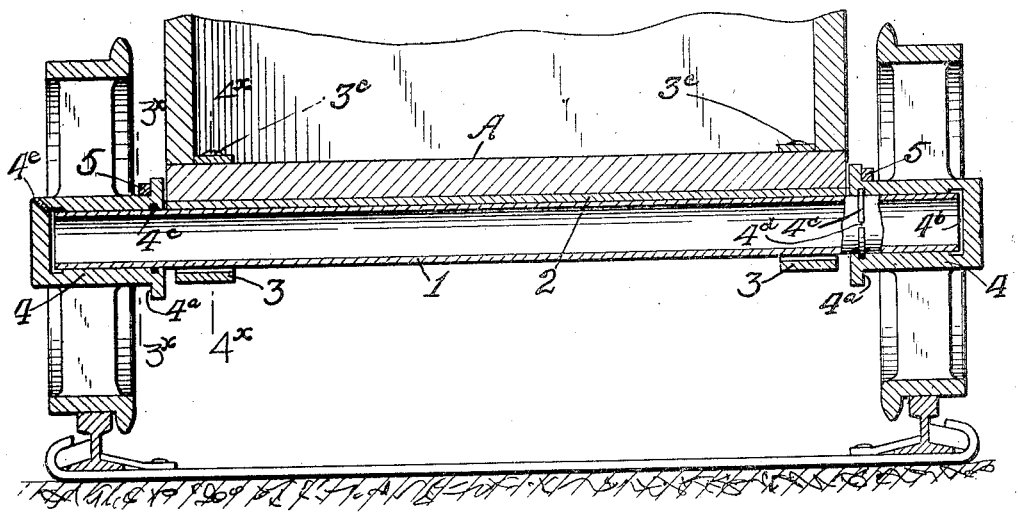

WALTER D. STOCKLY, OF FAIRMONT, WEST VIRGINIA, ASSIGNOR TO MINING APPLIANCES COMPANY, A CORPORATION OF WEST VIRGINIA.

MINE-CAR.

1,108,808.  Specification of Letters Patent.  Patented Aug. 25, 1914.

Application filed January 20, 1914. Serial No. 813,245.

*To all whom it may concern:*

Be it known that I, WALTER D. STOCKLY, a citizen of the United States, residing at Fairmont, in the county of Marion and State of West Virginia, have invented certain new and useful Improvements in Mine-Cars, of which the following is a specification.

This invention relates to vehicles of a type such as may be illustrated by a so-called mine car, which usually involves a body with axle and wheels of simple and durable construction mounted thereon in a simple and durable manner; and particularly to that class of such cars as employ tubular axles for the purpose of insuring lubrication for maximum time with minimum attention.

The invention has for its object to provide an improved construction of self-lubricating wheel and axle, and one which will be very simple in construction, economical in the consumption of lubricant and very durable in use. Some of the difficulties that have to be dealt with in accomplishing the object stated are the constant distribution of lubricant only in such proportions as the same shall be needed in relieving the natural friction of the wheels on the axle, in order to avoid waste, and a construction of wheel which when in place on the axle will exclude grit and foreign substances which develop excessive wear of the bearings. The present invention accomplishes these objects in an economical and efficient manner, by means of the construction hereinafter fully described and particularly pointed out in the sub-joined claims, reference being had to the accompanying drawing, in which—

Figure 1 is a vertical axial section through a portion of a mine car with its axle and wheels mounted thereon; Fig. 2 is a detail view of a portion of Fig. 1 seen from above; Fig. 3 is a section on the line $3^x$—$3^x$, Fig. 1; Fig. 4 is a section on the line $4^x$—$4^x$, Fig. 1; Fig. 5 is a detail view of the yoke holder and a portion of the bolster upon which the yoke holder is preferably mounted, and Fig. 6 is a detail view of the damming ring which is introduced between each wheel and the axle, for the purpose of limiting the escape of lubricant.

A represents, by way of suggestion, a vehicle body, and 1 is a tubular axle mounted thereon. The axle is secured in place with freedom of rotation as well as longitudinal movement, and this is preferably accomplished by means of an inverted channel bolster 2 and the clips or hangers 3. The latter are constructed to prevent the axle from dropping down in the event of the wheels being lifted momentarily from the rails and provided with shoulders $3^a$ through which they support the bolster 2, as well as ears $3^b$ to receive attaching bolts $3^c$.

4 represents the wheels which fit the outer ends of the axles, but have closed hubs so that they form hermetic end closures for the tubular axles; their bearing boxes being provided with enlargements $4^b$ surrounding the extreme outer end of the axle to facilitate radial flow of the lubricant under centrifugal action; these enlargements extending backward slightly from the ends of the axle in order to deliver the lubricant to the cylindrical surface of the axle spindles and cause it to flow between the wheel and axle under the combined influence of the rotating wheel and the pressure of other lubricant that is behind it. To restrict this flow of lubricant from the inner ends of the hubs, packing rings $4^c$ are provided within the hubs and tightly surrounding the axles, and these rings are provided with escape openings $4^d$ which are regulated in size so as to permit the escape of the lubricant only about as fast as it is consumed. The rings $4^c$ serve the further purpose of excluding dust and grit from the bearings.

The wheels are secured against displacement from the axle and are also effectively limited in outward movement relatively to the car body and to each other by means of the yoke holders $2^x$ mounted upon the ends of the bolster 2 and provided with the abutting shoulders $2^a$, the lugs $2^b$ and the seats $2^c$, which latter receive the yokes 5 in position to engage in front of the flanges $4^a$ of the wheels. The yokes 5 have at one end heads $5^a$ and lugs $5^b$ which adapt them to embrace one of the lugs $2^b$, while at the other end they are provided with nuts $5^c$ which secure them against displacement. They are preferably deflected to cause them to partially conform to the hubs of the wheels which they overlie and when in place securely tie the wheel against displacement although permitting some freedom of movement of the flanges 4ª between the yokes 5 and the shoulders 2ª.

The wheels being definitely spaced apart by a tying means, such as the bolster 2, exterior to the axle, the axle can be left free to reciprocate until its ends are arrested by the closed hubs of the wheels, which reciprocation is developed in the travel of the car, by rounding curves, encountering inequalities in track, etc. This affords a very simple means for maintaining the organization of the parts and it leaves the axle free to distribute lubricant upon the inner faces of the ends of the hubs, in restricted quantities, so that it will flow outwardly by centrifugal action until it enters the annular chamber between the end of the axle and the wheel, whence it flows into the bearings to be lubricated. The packing ring prevents a free escape of the lubricant and retards the flow. It, however, permits escape of spent lubricant through the opening 4ᵈ of the packing ring. Inasmuch as the opening 4ᵈ can be readily adjusted to such size as experience dictates to be desirable with the particular lubricant used, said ring affords a very efficient and simple method of reducing waste of lubricant. The reservoir afforded by the tubular axle may be filled in any suitable manner, as for instance by an opening 4ᵉ in one of the wheels, which being thereafter closed, leaves the wheels in principle hermetically closed and subject only to the feeding influences explained.

I claim:—

1. In a vehicle, a floating hollow axle and wheels independently secured relatively to and revolubly mounted on said axle and free to have a limited longitudinal movement on said axle, said wheels having closed hubs.

2. A running gear for vehicles including a hollow axle forming a lubricant reservoir and having wheel bearings at each end, wheels independently and revolubly mounted on the bearings of said axle, the axle box of the wheels being closed at their outer ends by an end wall which lies when in assembled position, in close proximity to the end of the floating axle, whereby the said end wall and the end of the axle coact to feed the lubricant from the axle to the axle bearings within the hub of the wheel.

3. In a wheeled vehicle, a reservoir axle, a wheel having a closed hub fitting over the end of said axle, and a packing ring between the hub and the axle near the inner end of the hub.

4. In a wheeled vehicle, a reservoir axle, a wheel having a closed hub fitting over the end of said axle, and a packing ring between the hub and the axle near the inner end of the hub, said ring having an opening to permit restricted escape of lubricant.

5. In a wheeled vehicle, a reservoir axle having an open end and a wheel having a hub with a closed end fitting over the open end of the axle; said hub having a diametrically enlarged chamber for conducting lubricant from the hollow of the axle on to the outer surface of the same.

6. In a wheeled vehicle, the combination of an axle, a wheel having a hub with a closed outer end, and a shouldered inner end, a yoke holder comprising a pair of ears projecting on opposite sides of the wheel hub, and a yoke extending through said ears and over the wheel hub in front of said shoulder; said yoke also having a laterally projecting head embracing one of said lugs.

7. In a wheeled vehicle, a tubular axle, closed end hubs fitting over the ends of said axle, a member extending across the vehicle outside of said axle, and yokes carried by said member and engaging the respective wheel hubs.

8. In a wheeled vehicle, the combination of a tubular axle, a channeled bolster extending across the vehicle and receiving said axle, yoke carriers formed on the ends of the bolster, yokes supported by said yoke carriers and wheels fitted to the ends of the axle and having shoulders engaged by said yokes.

The foregoing specification signed at Fairmont, West Virginia, this 7th day of January, 1914.

WALTER D. STOCKLY.

In presence of two witnesses:
J. C. EVANS,
B. MASSEY.